US006874799B2

(12) United States Patent
Robberson et al.

(10) Patent No.: US 6,874,799 B2
(45) Date of Patent: Apr. 5, 2005

(54) FOLDING HAND TRUCK

(76) Inventors: James D. Robberson, 1012 N.M. 89, Melrose, NM (US) 88124; Beverly J Robberson, 1012 N.M. 89, Melrose, NM (US) 88124

( * ) Notice: Subject to any disclaimer, the term of this patent is extended or adjusted under 35 U.S.C. 154(b) by 0 days.

(21) Appl. No.: 10/356,054

(22) Filed: Feb. 1, 2003

(65) Prior Publication Data

US 2004/0150195 A1 Aug. 5, 2004

(51) Int. Cl.[7] .............................................. B62B 1/00
(52) U.S. Cl. ................ 280/47.27; 280/652; 280/47.41; 280/654
(58) Field of Search .................... 280/654, 47.41, 280/659, 651, 639, 652, 655, 655.1, 47.17, 47.18, 47.19, 47.24, 47.29, 47.371, 40, 47.27

(56) References Cited

U.S. PATENT DOCUMENTS

| | | | | |
|---|---|---|---|---|
| 2,490,189 A | * | 12/1949 | Alexander | 280/655 |
| 3,043,603 A | * | 7/1962 | Major, Sr. | 280/40 |
| 3,241,852 A | * | 3/1966 | Muller et al. | 280/40 |
| 3,788,659 A | * | 1/1974 | Allen | 280/47.27 |
| 4,185,853 A | * | 1/1980 | Thurmond, Jr. | 280/652 |
| 4,448,434 A | * | 5/1984 | Anderson | 280/40 |
| 4,679,817 A | * | 7/1987 | Schufer | 280/655 |
| 4,896,897 A | * | 1/1990 | Wilhelm | 280/655 |
| 4,917,392 A | * | 4/1990 | Ambasz | 280/40 |
| 4,993,727 A | * | 2/1991 | vom Braucke et al. | 280/40 |
| 5,549,317 A | * | 8/1996 | Dunkle | 280/652 |
| 5,803,471 A | * | 9/1998 | DeMars et al. | 280/40 |
| 5,971,424 A | * | 10/1999 | Ingalls | 280/654 |

* cited by examiner

Primary Examiner—Christopher P. Ellis
Assistant Examiner—Hau Phan
(74) Attorney, Agent, or Firm—Aaron R. Clements; Hurley, Reyes & Guinn

(57) ABSTRACT

A folding hand truck comprising an upper frame, a middle frame, a lower frame, a platform, and a dual wheel assembly. The lower end of the upper frame is rotatably connected to the upper end of the middle frame, and the upper end of the middle frame is rotatably connected to the upper end of the lower frame, and the respective ends contain locking pins for locking the upper frame, middle frame, and lower frame in a substantially coplanar orientation. The platform is rotatably connected to the bottom of the lower frame such that the rear edge of the platform contacts the lower end of the lower frame in the operative position. The dual wheel assembly has a central bracket mounted to the rear side of the lower frame and has two rotatable wheel brackets capable of being locked in both operative and folded positions. When in the folded position, the platform folds into the lower frame, which folds into the middle frame. The upper frame folds into the middle frame over the lower frame between the wheels, which are then folded over the upper frame and locked in place, securing the hand truck in the folded position.

3 Claims, 6 Drawing Sheets

FOLDING HAND TRUCK

CROSS REFERENCE TO RELATED APPLICATIONS

Not Applicable.

STATEMENT REGARDING FEDERALLY SPONSORED RESEARCH

Not Applicable.

REFERENCE TO "MICROFICHE APPENDIX"

Not Applicable.

BACKGROUND OF THE INVENTION

This Invention relates to a folding hand truck for use in moving heavy objects. Hand trucks, also referred to as dollies, have been known in the art for many years and have enjoyed widespread use by allowing a single person to move large and/or heavy objects easily. Hand trucks are typically designed with horizontal platform for supporting a load attached perpendicularly to a vertical frame for resting the load with a handle at the upper portion of the frame, a pair of wheels located at the bottom of the frame, and occasionally a secondary set of caster wheels mounted at the top of the frame for additional support and maneuverability with the frame rotated into a horizontal position. Collapsible and folding hand trucks are also known within the art; the typical arrangements involve means for folding the horizontal platform into a position coplanar with the vertical frame and/or means for collapsing or telescoping elements of the vertical frame. For instance, Ingalls, U.S. Pat. No. 5,971,424 and DeMars, et al., U.S. Pat. No. 5,803,471 each describe a hand cart with a collapsing handle and folding platform. The desirable elements of such collapsible hand trucks include a minimization of storage space required for the hand truck when not being used while maintaining sturdiness and ability to move heavy loads in the fully assembled position. Collapsible-handled hand trucks, however, tend to lose some mechanical sturdiness due to the smaller diameter material used to make the inner telescoping portions of the frame.

The present invention fulfills the need for a compact and sturdy hand cart in a fashion superior to the prior art by providing an extremely compact yet strong folding hand truck that takes up a minimum of volume in its folded position yet enjoys a mechanical strength equivalent to that of non-folding, non-collapsible hand trucks when in its unfolded position.

SUMMARY OF THE INVENTION

In accordance with the present invention, a folding hand truck having both a folded position for storage as well as an operative position for general use is described. The truck includes a vertical frame composed of three sections, an upper frame, a middle frame, and a lower frame. The truck further includes a dual wheel assembly connected to the rear of the bottom portion of the lower frame such that one wheel is oriented vertically on either side of the hand truck in the unfolded position. The dual wheel assembly includes a pair of wheels, each rotatably connected to a wheel bracket via a wheel axle. The wheel bracket is rotatably connected by a pivot to the dual wheel assembly bracket, which is connected to the lower frame as described. The dual wheel assembly bracket includes two wheel bracket locking pins, with one locking pin corresponding to each of the wheel brackets. By use of the locking pins, the wheels can be locked in two or more positions, including the fully folded and fully unfolded positions.

The upper frame of the present Invention consists of an inverted "u"-shaped tube connected at the bottom two points of the inverted "u" to an upper frame lower crossbar. Additionally, an upper backstrap serves as a handle and consists of a curved second tube attached at its upper end the midpoint of the upper portion of the described inverted "u," extending down to where its lower end is attached to the midpoint of the upper frame lower crossbar.

The middle frame of the present Invention consists of three tubes arranged side-by-side, with a left side tube, a middle tube, and a right side tube connected at their upper ends to a middle frame upper crossbar and at their lower ends to a middle frame lower crossbar. Additionally, the upper and lower ends of the left side and right side tubes of the middle frame have frame locking pins. Each frame locking pin is a solid cylinder which is of the same cross-sectional shape as the tube in which it resides, and is approximately equal to or smaller in cross-sectional dimension as the inner diameter of the tube in which it resides. Each locking pin includes a locking pin actuating lever which extends through a groove cut in the side of the tubing which runs parallel to the longitudinal axis of the tubing. This actuating lever and groove allows the locking pin to slide a limited distance within the tube such that the locking pin may be moved from a position in which a portion of the locking pin extends from the open end of the tube to a position in which the locking pin is contained entirely within the tube. Each locking pin is held in the extended position with a spring which is located in the tube.

Similar to the middle frame, but lacking the frame locking pins, the lower frame of the present Invention consists of three tubes arranged side-by-side, connected at their upper ends to a lower frame upper crossbar and at their lower ends to a lower frame lower crossbar. The side tubes of the lower frame are substantially shorter than the side tubes of the middle frame. The upper frame lower crossbar is rotatably connected to the middle frame upper crossbar, and the middle frame lower crossbar is rotatably connected to the lower frame upper crossbar. Additionally, there is a platform rotatably connected to the lower frame lower crossbar at a distance from the rear edge of the platform such that the lower frame lower crossbar prevents the platform from rotating greater than ninety degrees.

In the operational position, the upper frame, middle frame, and lower frame unfold to form one vertical frame. The upper ends of the side tubes of the lower frame align with the lower ends of the side tubes of the middle frame, and the upper ends of the side tubes of the middle frame align with the lower ends of the inverted "u" of the upper frame. In this position, the locking pins extend from their positions in the side tubes of the middle frame into the corresponding tubes of the upper and lower frames, thereby locking the three frames into one rigid vertical frame. The locking pins supply great mechanical strength equivalent to or greater than that available from a frame constructed from one continuous tube. The third tube of the upper frame which curves from the upper portion of the inverted "u" of the upper frame to the upper frame lower crossbar provides the user with a handle. The platform unfolds from a vertical position coplanar with the lower frame to a horizontal position perpendicular to the lower frame. The wheels unfold on the dual wheel assembly bracket and are locked in place parallel to and coaxial with each other such that the entire apparatus can be easily rolled by hand in a manner identical to that of conventional hand trucks. In an alternative operative position, the wheels remain in the folded, locked position, in which orientation the hand truck may be moved laterally.

In the folded position, the platform folds into a vertical position flush with and coplanar to the lower frame. The lower pair of locking pins are retracted manually, allowing the joint between the middle frame and lower frame to fold on the front side of the apparatus, with the lower frame rotating up to the middle frame such that the platform rests between the middle frame and lower frame. The upper pair of locking pins are then also retracting manually, allowing the joint between the middle frame and upper frame to fold on the front side of the apparatus, with the upper frame rotating down over the lower frame in its retracted position. In this position, the upper frame rests over the dual wheel assembly bracket. The wheel bracket locking pins may then be retracted and the wheels folded down over the upper frame until the wheels are in the fully folded position. The wheel brackets are then locked in the folded position; in this position the wheels hold the upper frame in place. The backstrap of the upper frame which forms the handle of the apparatus in the operational position is thus oriented to also serve the function of handle in the folded position.

DETAILED DESCRIPTION OF THE INVENTION

Figure 1:
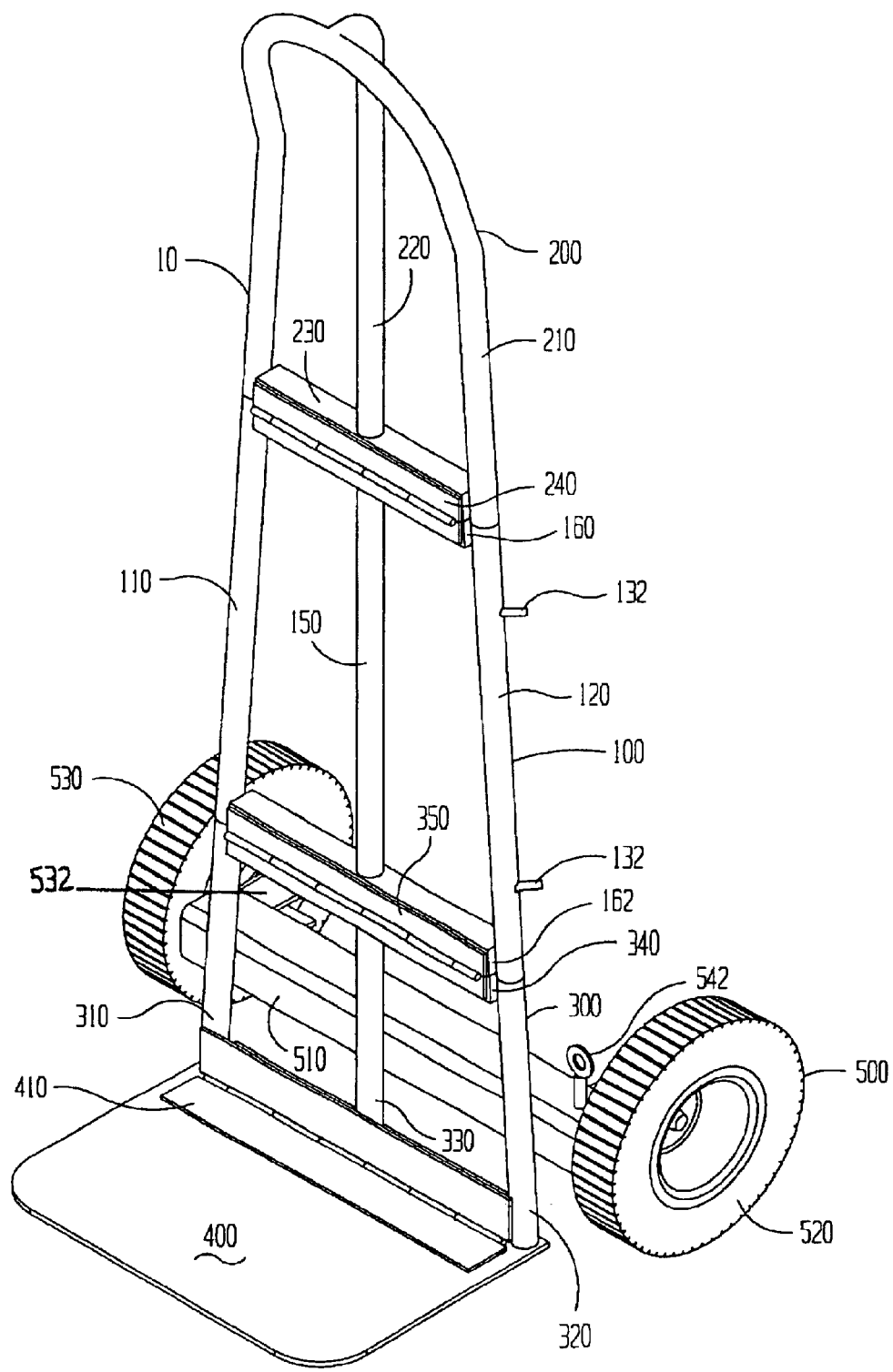
FIG. 1 is a perspective view of the folding hand truck in its operational position.

FIGS. 1, 2, 3, 4, 6, and 7 are perspective views of the preferred embodiment of the hand truck comprising the Invention. In these figures can be seen the middle frame 100, upper frame 200, and lower frame 300 which, together, form the overall frame of the hand truck in the operational position.

The upper frame 200 comprises a curved main tube 210 forming an inverted U, with the inner sides of the points of the inverted U connected by an upper frame lower crossbar 230. The upper portion of the curved main tube 210 is bent to the front of the hand truck slightly out of the plane of the lower portion of the curved main tube 210. An upper frame backstrap 220 comprising a curved tube extends from the upper portion of the curved main tube 210 to the upper frame lower crossbar 230. The lower frame 300 comprises a lower frame right tube 310, a lower frame left tube 320, and a lower frame center tube 330. A lower frame upper crossbar 340 connects the sides of the upper portions of the lower frame right tube 310 and lower frame left tube 320, while a lower frame lower crossbar 342 connects the sides of the lower portions of the lower frame right tube 310 and lower frame left tube 320.

Figure 8:
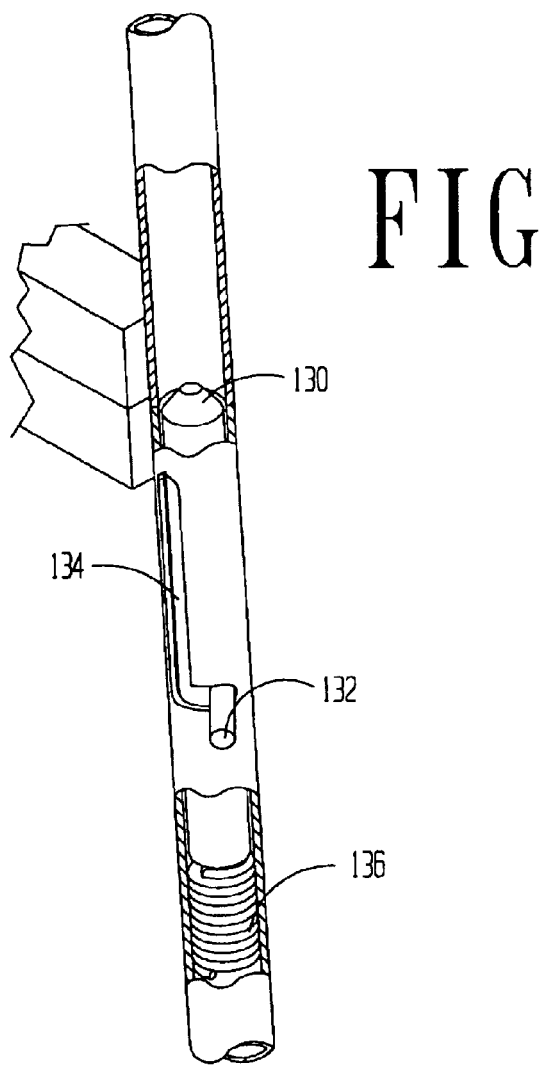
FIG. 8 is a cutaway view of the middle-to-upper frame locking pins and locking pin springs.
Figure 9:
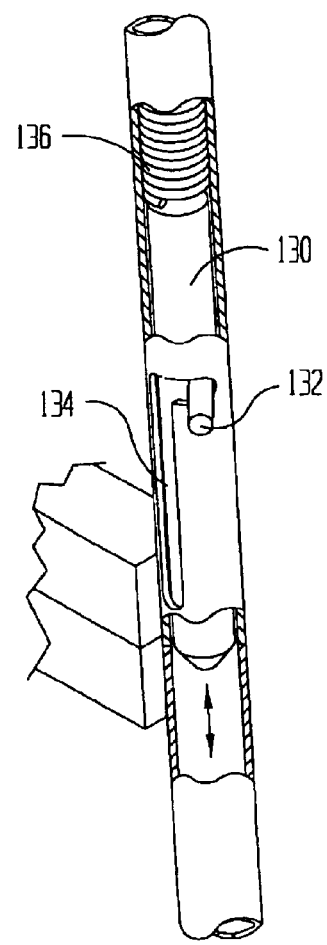
FIG. 9 is a cutaway view of the middle-to-lower frame locking pins and locking pin springs.

The middle frame 100 comprises a middle frame right tube 110, a middle frame left tube 120, and a middle frame center tube 150. A middle frame upper crossbar 160 connects the sides of the upper portions of the middle frame right tube 110 and middle frame left tube 120, while a middle frame lower crossbar 162 connects the sides of the lower portions of the middle frame right tube 110 and middle frame left tube 120. The ends of the middle frame center tube 150 are connected to the midpoints of the lower surface of the middle frame upper crossbar 160 and the upper surface of the middle frame lower crossbar 162. In the upper and lower ends of each of the middle frame right tube 110 and middle frame left tube 120 is a middle frame locking pin 130. Each middle frame locking pin 130 is a solid cylinder with a diameter substantially equal to or slightly smaller than the inner diameter of the corresponding end of either the middle frame right tube 110 and middle frame left tube 120. Each middle frame locking pin 130 has a cross-section substantially identical to the cross-section of the interior diameter of the corresponding end of either the middle frame right tube 110 and middle frame left tube 120. A middle frame locking pin actuating lever 132 is mounted perpendicular to the long axis of each middle frame locking pin 130. As shown in FIGS. 8 and 9, at each end of the middle frame right tube 110 and middle frame left tube 120 is a middle frame locking pin slot 134 which consists of a cutout through the outer wall of said tubes which extends parallel to the long axis of said tubes. As shown in FIGS. 8 and 9, in the preferred embodiment of the Invention, each middle frame locking pin slot 134 also comprises a short transverse portion at the end of the locking pin slot farthest from its corresponding tube end. Each middle frame locking pin actuating lever 132 extends through the middle frame locking pin slot 134. Each middle frame locking pin 130 is thus limited to a range of motion within its corresponding tube end defined by the length of the middle frame locking pin slot 134. If the middle frame locking pin slots 134 include the short transverse portion described earlier, the middle frame locking pin actuating lever 132 may be rotated into this short transverse portion, thereby holding the middle frame locking pin 130 in place within the corresponding tube end. Each middle frame locking pin 130 has a corresponding middle frame locking pin spring 136 which is located inside the corresponding tube end on the side of the middle frame locking pin 130 farthest from the tube end. These middle frame locking pin springs 136 may act against one another within the tube, or may act against a stop point placed within the tube but not pictured in the drawings. Those of ordinary skill in the art will understand the method of placing such springs such that each spring will operate on its corresponding middle frame locking pin 130, forcing the middle frame locking pin 130 out of the corresponding tube end until the middle frame locking pin actuating lever 132 reaches the end of the middle frame locking pin slot closest to the corresponding tube end. It is understood that in this position, a portion, preferably half, of the middle frame locking pin 130 extends from the corresponding end of either the middle frame right tube 110 or middle frame left tube 120, but that a user may manually actuate the middle frame locking pin actuating lever to withdraw the middle frame locking pin into the corresponding tube end.

Referring again to FIGS. 1–4 and 6–7, the middle frame 100 is connected to the upper frame 200 and to the lower frame 300 by means of two hinges, an upper-to-middle frame hinge 240 and a lower-to-middle frame hinge 350. The upper-to middle frame hinge 240 is connected to the forward portions of the upper frame lower crossbar 230 and the middle frame upper crossbar 160. The lower-to-middle frame hinge 350 is connected to the forward portions of the lower frame upper crossbar 340 and the middle frame lower crossbar 162. Additionally, the platform 400 is attached by a platform hinge 410 to the lower frame 300. The platform hinge 410 is attached to the forward portion of the lower frame lower crossbar 342. Additionally, the platform hinge 410 is attached to the platform 400 at a distance from and parallel to the rear edge of the platform 400 approximately equal to the diameter of the lower frame right tube 310 and lower frame left tube 320. As shown in FIG. 1, when the platform 400 is in the unfolded position, the rear portion of the platform 400 is oriented directly underneath the bottom of the lower frame 300. In this position, the lower frame 300 stops rotation of the platform 400 and platform hinge 410 at a point where the platform 400 is substantially perpendicular to the plane of the lower frame 300.

Figure 3:
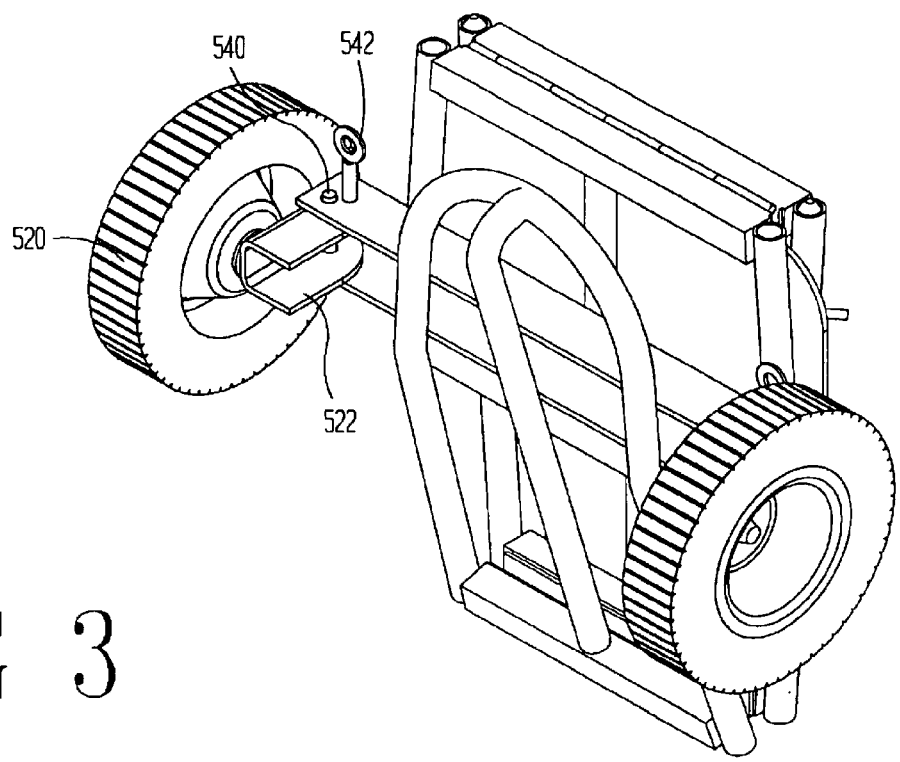
FIG. 3 is a perspective view of the folding hand truck showing one wheel unfolded.
Figure 4:
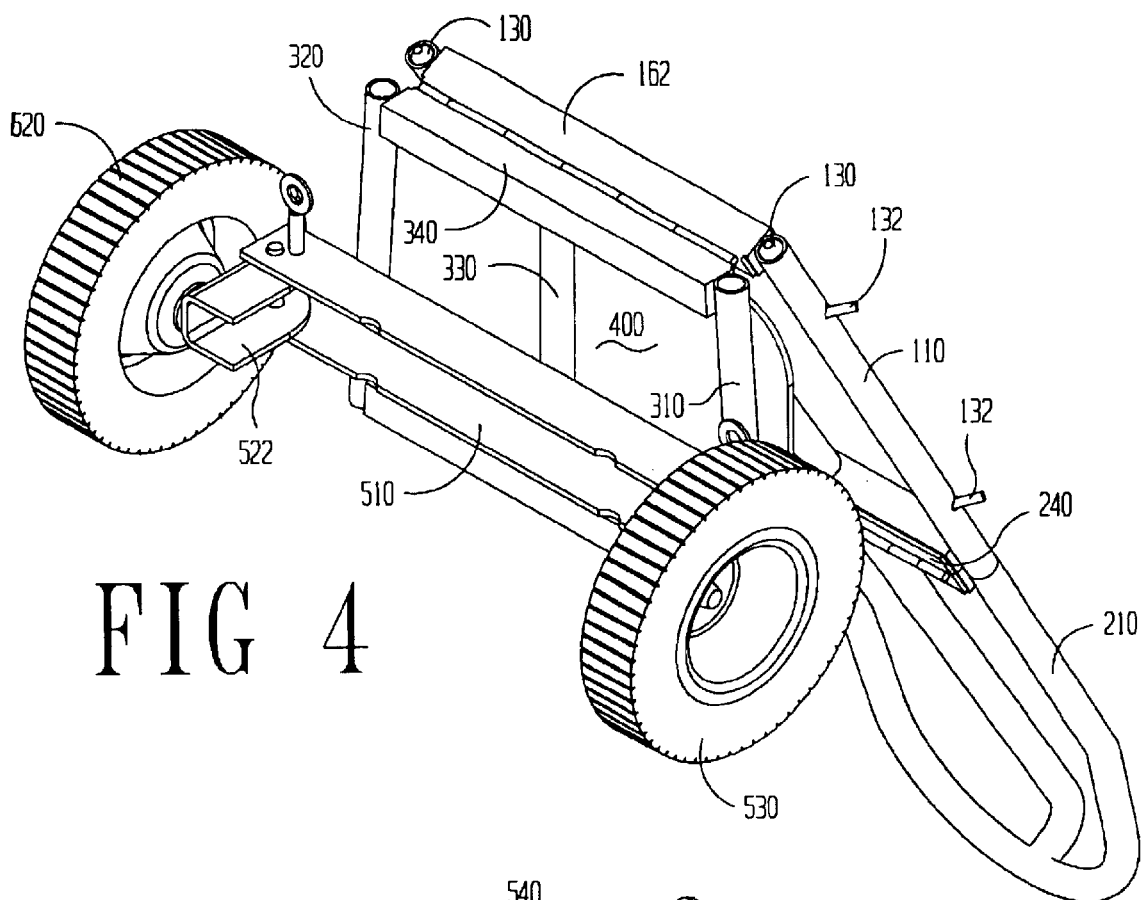
FIG. 4 is a perspective view of the folding hand truck with both wheels unfolded, the upper frame locked in its operational position, and the lower frame in the process of being rotated into its operational position.
Figure 5:
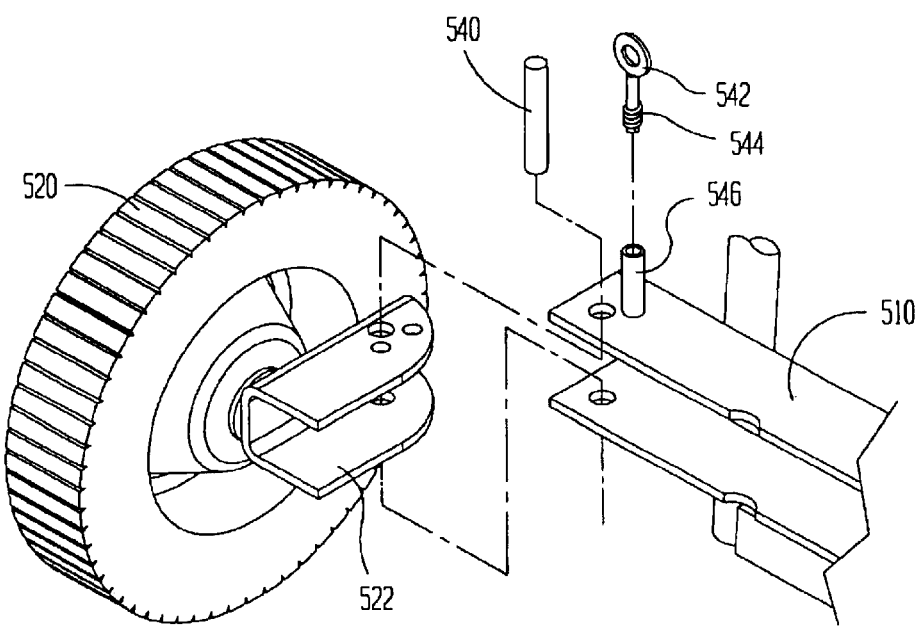
FIG. 5 is an exploded view of the linkage of the wheel bracket to the dual wheel assembly bracket.
Figure 6:
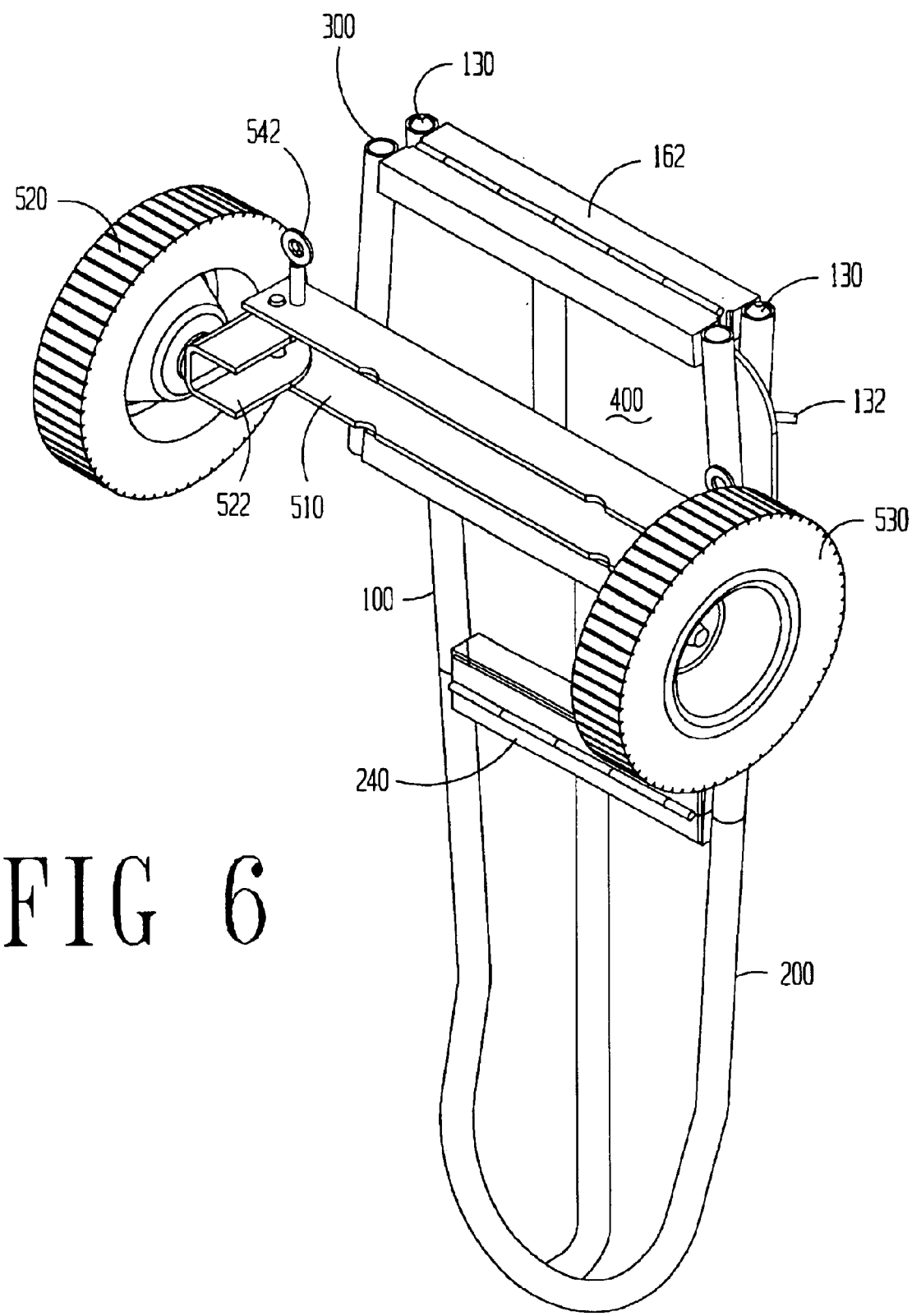
FIG. 6 is a perspective view of the folding hand truck with both wheels unfolded and with the upper frame locked in its operational position.
Figure 7:
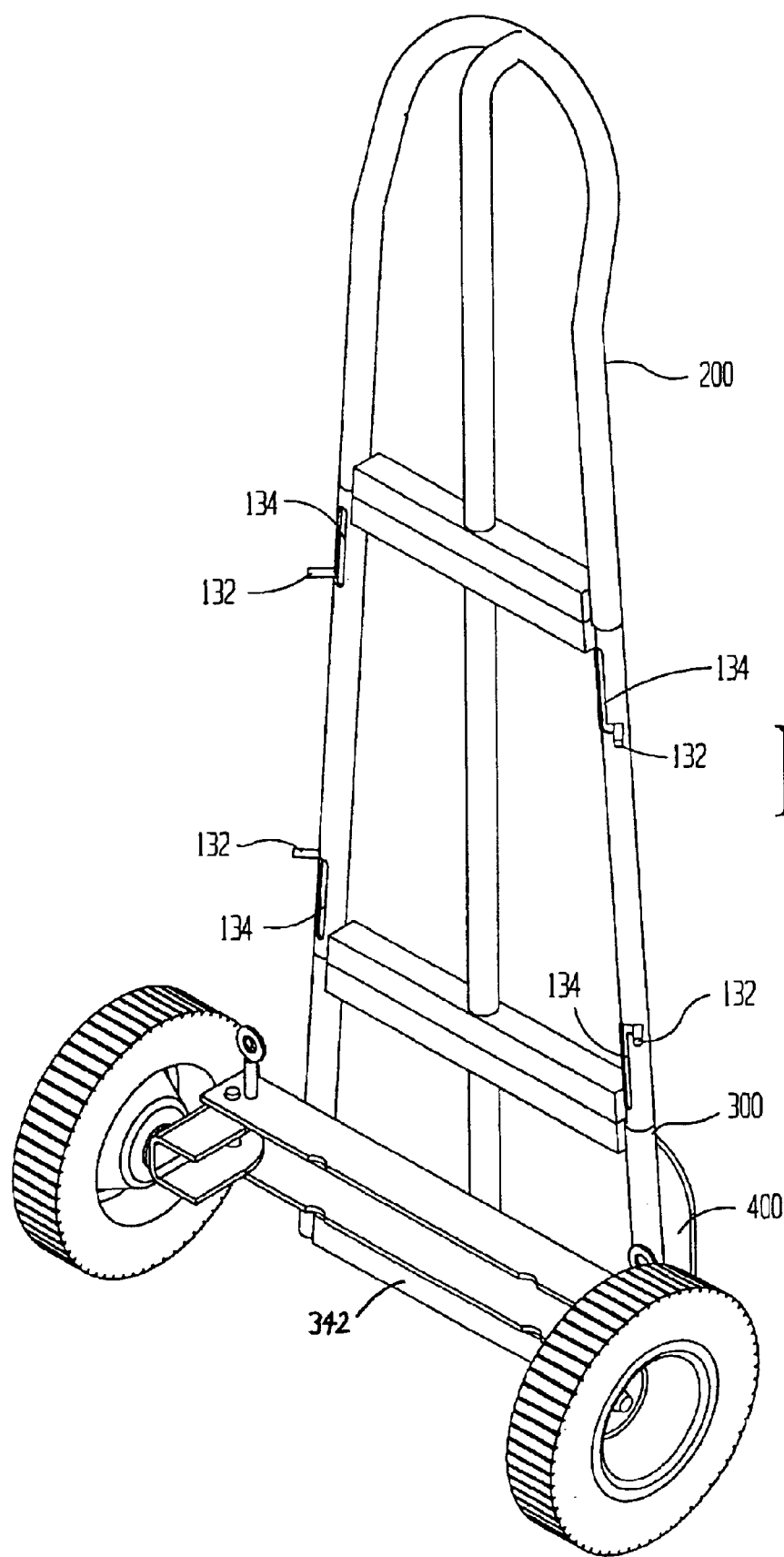
FIG. 7 is a rear perspective view of the folding hand truck with both wheels unfolded and with both the upper and lower frames locked in their operational positions.

Attached to the rear of the lower frame 300 is a dual wheel assembly 500. Particularly, a dual wheel assembly bracket 510 is attached to the lower frame right tube 310, lower frame left tube 320, and lower frame center tube 330. The dual wheel assembly bracket 510 comprises an elongate U-shaped channel, with the open side of the dual wheel assembly bracket 510 oriented to the rear of the Invention. The dual wheel assembly bracket 510 is attached to the lower frame such that the dual wheel assembly bracket 510 is substantially parallel to the centerline of the Invention defined by the lower frame center tube 330. Referring particularly to FIGS. 3, 4, and 5, the dual wheel assembly 500 comprises the dual wheel assembly bracket 510 as well as a number of other components. At the ends of the dual wheel assembly bracket 510 are a left wheel bracket 522 and a right wheel bracket 532. Each of these wheel brackets is a short "u"-shaped bracket which has a curved end and a squared end. Each of these wheel brackets is connected at its curved end to the dual wheel assembly bracket 510 by means of a wheel bracket pivot 540, which passes through the upper and lower surfaces of both the dual wheel assembly bracket 510 and the corresponding wheel bracket, with the open end of the wheel bracket oriented inwards towards the centerline of the Invention. A left wheel 520 is mounted to the outer surface of the left wheel bracket 522, and a right wheel 530 is mounted to the outer surface of the right wheel bracket 532. Additionally, at each end of the dual wheel assembly bracket 510, a wheel bracket locking pin 542 is mounted to the top surface of the dual wheel assembly bracket 510 at distance from the corresponding wheel bracket pivot 540 wherein said distance is less than the radius of curvature of the curved end of either the left wheel bracket 522 or right wheel bracket 532. Each of the wheel bracket locking pins 542 are mounted to the dual wheel assembly bracket 510 by a wheel bracket locking pin sleeve 546, which includes a wheel bracket locking pin spring 544. In its rest position, the wheel bracket locking pin spring 544 pulls the corresponding wheel bracket locking pins 542 down into the wheel bracket locking pin sleeve 546 such that the end of the wheel bracket locking pin 542 extends through the dual wheel assembly bracket 510. Each of the left wheel bracket 522 and right wheel bracket 532 has two holes through its upper surface at a distance from the wheel bracket pivot 540 equal to the distance between the wheel bracket pivot 540 and the corresponding wheel bracket locking pin 542. By this orientation, as seen particularly in FIG. 5, the corresponding wheel bracket locking pin 542 may pass through the holes on either the left wheel bracket 522 and the right wheel bracket 532. The holes are oriented such that when a wheel bracket locking pin 542 extends through its corresponding wheel bracket, the wheel is locked either in the folded position or the unfolded position. Those with ordinary skill in the art will understand the method of mounting the wheel bracket locking pin 542, wheel bracket locking pin spring 544, and wheel bracket locking pin spring 546 and the placement of the holes in the left wheel bracket 522 and right wheel bracket 532 in order to effectuate this operation.

To move from a folded position to an unfolded position, a user first pulls the wheel bracket locking pins 542 and rotates each wheel from a position flat against the open portion of the dual wheel assembly bracket 510 to a position perpendicular to the dual wheel assembly bracket 510. In the preferred embodiment of the Invention, the user then rotates the upper frame 200 into a position where the lower portion of the upper frame 200 is coplanar with the middle frame 100. The user then releases the uppermost pair of middle frame locking pins 130, which extend from the middle frame right tube 110 and middle frame left tube 120 into the right and left ends, respectively, of the upper frame main tube 210, thereby locking the middle frame 100 and upper frame 200 together. The user then rotates the combination of the middle frame 100 and upper frame 200 with respect to the lower frame 300 until the lower frame 300 is coplanar with the middle frame 100. As before, the user then releases the lower pair of middle frame locking pins 130, which then extend from the middle frame right tube 110 and middle frame left tube 120 into the lower frame right tube 310 and lower frame left tube 320, respectively. Finally, the user rotates the platform 400 down until its rear portion contacts the bottom of the lower frame 300. The invention may then be operated in this configuration, or the left wheel 520 and right wheel 530 may be rotated back into the folded, coplanar position. To return the Invention to its folded position, the user merely reverses this sequence.

Figure 2:
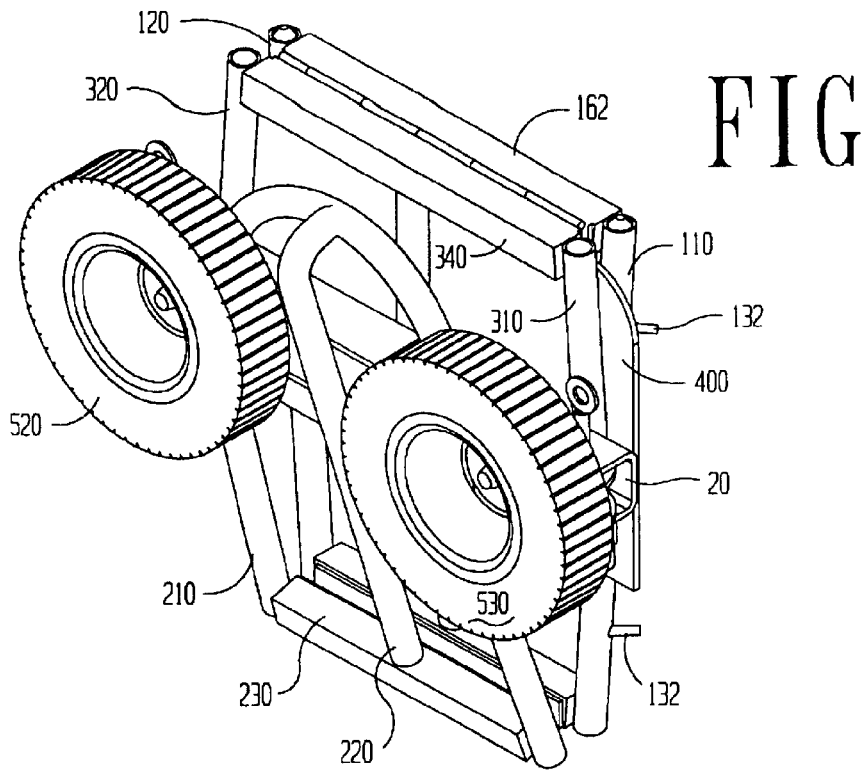
FIG. 2 is a perspective view of the folding hand truck in the fully folded position.

As seen in FIGS. 2 and 3, the folded hand truck 20 is substantially compact by comparison with the unfolded hand truck 10. This is due to the geometry of each piece folding into precise arrangement, with the left wheel 520 and right wheel 530 locking the folded hand truck 20 into place when in the folded position. Despite the compactness of the folded hand truck 20, due to the strength of the middle frame locking pins 130, the unfolded hand truck 10 has the sturdiness of a non-foldable hand truck with a frame formed from a single piece. While the Invention may be formed from any suitably strong material, it is understood that the preferred material is steel. Those familiar with the art will understand the components of the invention, their methods of manufacture, and the methods of connecting them to form the complete Invention. While the preferred embodiment has been described, it will furthermore be understood that various changes can be made therein without departing from the spirit and scope of the invention.

Catalogue of Elements

10 Unfolded hand truck
20 Folded hand truck
100 Middle frame
110 Middle frame right tube
120 Middle frame left tube
130 Middle frame locking pin
132 Middle frame locking pin actuating lever
134 Middle frame locking pin slot
136 Middle frame locking pin spring
150 Middle frame center tube
160 Middle frame upper crossbar
162 Middle frame lower crossbar
200 Upper frame
210 Upper frame main tube
220 Upper frame backstrap tube 230 Upper frame lower crossbar
240 Upper-to-middle frame hinge
300 Lower frame
310 Lower frame right tube
320 Lower frame left tube
330 Lower frame center tube
340 Lower frame upper crossbar
342 Lower frame lower crossbar
350 Lower-to-middle frame hinge
400 Platform
410 Platform hinge
500 Dual wheel assembly
510 Dual wheel assembly bracket
520 Left wheel
522 Left wheel bracket
530 Right wheel
532 Right wheel bracket
540 Wheel bracket pivot
542 Wheel bracket locking pin
544 Wheel bracket locking pin spring
546 Wheel bracket locking pin sleeve

What is claimed is:

1. A folding hand truck having storage and operative positions comprising:

a. a middle frame having an upper end, a lower end, a front side, and a back side, further comprising a left tube and a right tube, with each of said left tube and said right tube having an upper end and a lower end;

b. an upper frame having an upper end, a lower end, a front side, and a back side, further comprising an inverted U-shaped tube having a left end and a right end, wherein said lower end of said upper frame is rotatably connected to said upper end of said middle frame, with locking means for locking said lower end of said upper frame to said upper end of said middle frame;

c. a lower frame having an upper end, a lower end, a front side, and a back side, further comprising a left tube and a right tube, with each of said left tube and said right tube having an upper end and a lower end, wherein said upper end of said lower frame is rotatably connected to said lower end of said middle frame by hinge means, with locking means for locking the upper end of said lower frame to the lower end of said middle frame;

d. a platform, having a rear edge, rotatably connected to said lower end of said lower frame by hinge means such that in the operative position, said rear edge of said platform extends below said lower end of said lower frame to said rear side of said lower frame; and e. a dual wheel assembly further comprising a left wheel and a right wheel, with each of said wheels being rotatably connected at its center to said lower frame by means for folding said wheels from a position wherein the plane of each of said wheels is parallel with said lower frame to a position wherein said plane of said wheels are parallel to each other and are perpendicular to the plane of said lower frame;

f. wherein said means for locking said lower end of said upper frame to said upper end of said middle frame and said means for locking said upper end of said lower frame to said lower end of said middle frame comprise locking pins;

g. wherein said left end of said upper frame aligns coaxially with said upper end of said left tube of said middle frame, and said right end of said upper frame aligns coaxially with said upper end of said right tube of said middle frame when said folding hand truck is in the operative position;

h. wherein said lower end of said left tube of said middle frame aligns coaxially with said upper end of said left tube of said lower frame, and said lower end of said right tube of said middle frame aligns coaxially with said upper end of said right tube of said lower frame when said folding hand truck is in the operative position; and i. wherein said locking pins are mounted within and slide within said ends of said tubes such that:
      (i) one of said locking pins overlaps said left end of said upper frame and said upper end of said left tube of said middle frame;
      (ii) one of said locking pins overlaps said right end of said upper frame and said upper end of said right tube of said middle frame;
      (iii) one of said locking pins overlaps said lower end of said left tube of said middle frame and said upper end of said left tube of said lower frame; and
      (iv) one of said locking pins overlaps said lower end of said right tube of said middle frame and said upper end of said right tube of said lower frame.

2. The collapsible hand truck of claim 1, wherein said dual wheel assembly further comprises a horizontal U-shaped wheel assembly mounting bracket having a left end and a right end, with said wheel assembly mounting bracket attached to said rear side of said lower end of said lower frame, with the open side of the U facing away from said lower frame, and wherein said means for folding said wheels from a position substantially coplanar with said lower frame to a position perpendicular to the plane of said lower frame further comprise:

a. a U-shaped left wheel bracket having a curvate end, with said curvate end rotatably attached to said left end of said wheel assembly mounting bracket by means of a pivot pin, wherein the open end of the U is oriented toward the centerline of said folding hand truck and wherein said left wheel is rotatably connected to the closed end of the U, and wherein said left wheel bracket further comprises a folded position hole and an operative position hole in a side of the U;

b. a U-shaped right wheel bracket having a curvate end, with said curvate end rotatably attached to said right end of said wheel assembly mounting bracket by means of a pivot pin, wherein the open end of the U is oriented toward the centerline of said folding hand truck and wherein said right wheel is rotatably connected to the closed end of the U, and wherein said right wheel bracket further comprises a folded position hole and an operative position hole in a side of the U;

c. a left wheel bracket locking pin which passes through a side of said wheel assembly mounting bracket and can pass through either said folded position hole of said left wheel bracket or said operative position hole of said left wheel bracket; and d. a right wheel bracket locking pin which passes through a side of said wheel assembly mounting bracket and can pass through either said folded position hole of said right wheel bracket or said operative position hole of said right wheel bracket.

3. The collapsible hand truck of claim 2 wherein said platform rotates into a coplanar orientation with said lower frame, wherein said lower frame then rotates into said middle frame, wherein said upper frame then rotates into said middle frame over said lower frame between said wheels, and wherein said wheels then rotate into a locked position over said upper frame.

* * * * *